United States Patent [19]

Billet

[11] 4,371,068
[45] Feb. 1, 1983

[54] CLUTCH RELEASE BEARINGS

[75] Inventor: René Billet, Lamorlaye, France

[73] Assignee: VALEO Societe Anonyme, Paris, France

[21] Appl. No.: 184,629

[22] Filed: Sep. 8, 1980

[30] Foreign Application Priority Data

Sep. 10, 1979 [FR] France .................. 79 22532

[51] Int. Cl.$^3$ ............................................ F16D 23/00
[52] U.S. Cl. .................................. 192/98; 192/110 B
[58] Field of Search .................. 192/98, 98 A, 110 B, 192/110 R

[56] References Cited

U.S. PATENT DOCUMENTS

| | | | |
|---|---|---|---|
| 3,416,637 | 12/1968 | Maurice | 192/98 |
| 3,900,091 | 8/1975 | Maucher | 192/98 |
| 3,920,107 | 11/1975 | Limbacher | 192/98 |
| 3,951,244 | 4/1976 | Neder | 192/98 |
| 4,026,398 | 5/1977 | Matyschik et al. | 192/98 |
| 4,029,186 | 6/1977 | De Gennes | 192/98 |

FOREIGN PATENT DOCUMENTS

| | | | |
|---|---|---|---|
| 7336893 | 5/1974 | France | |
| 1433630 | 4/1976 | United Kingdom | 192/98 |
| 1454790 | 11/1976 | United Kingdom | 192/98 |

Primary Examiner—George H. Krizmanich
Attorney, Agent, or Firm—Charles A. Brown

[57] ABSTRACT

The invention relates to a clutch release bearing, particularly for motor vehicles, of the kind comprising an operating element, which is acted on by a clutch fork, a drive element, which, under the action of the operating element, acts on the disengaging mechanism of the clutch, and axially acting elastic means, which are supported by the operating element and bear on the drive element in order to hold the latter against a bearing plate which is axially fast with the operating element. According to the invention, the circumference along which these axially acting elastic means bear on the drive element has a diameter which is approximately equal to the diameter of the circumference along which the drive element is capable of bearing on the disengaging mechanism of the clutch. As a result, the axially acting elastic means are not able to cause a rocking torque on the drive element, which is thus maintained in axial alignment with the operating element. Furthermore, the clutch release bearing will be of compact construction.

13 Claims, 10 Drawing Figures

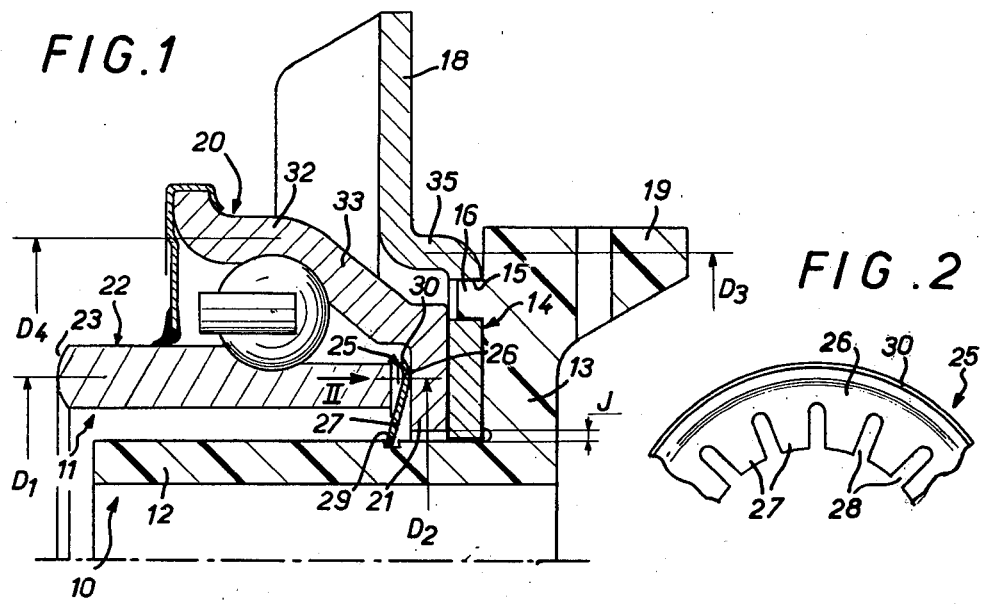

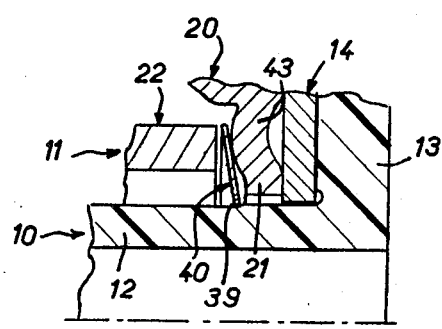
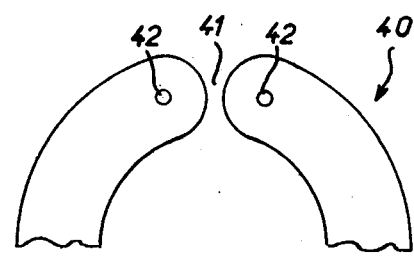
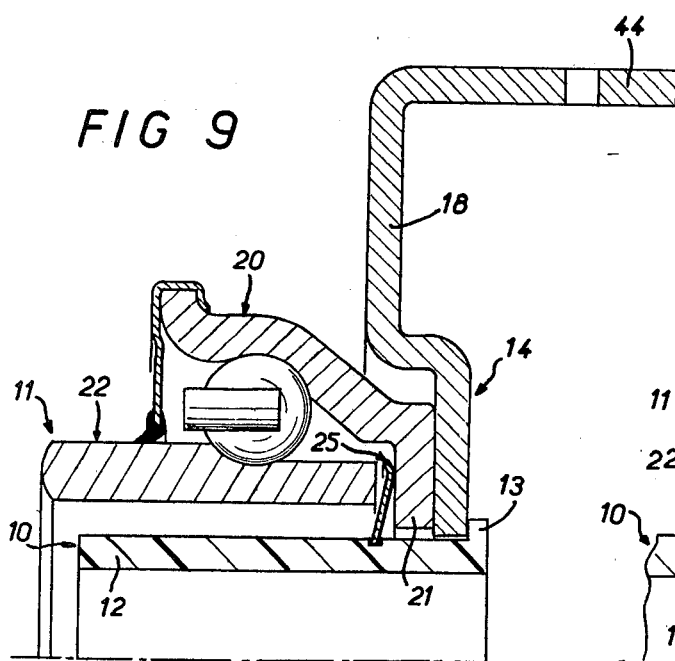
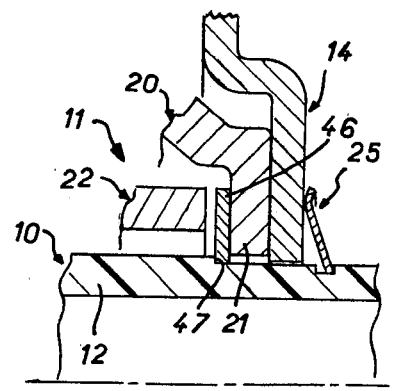

CLUTCH RELEASE BEARINGS

BACKGROUND OF THE INVENTION

The present invention relates to clutch release bearings, that is to say members which are intended to act on the disengaging mechanism of a clutch, in particular for motor vehicles.

As is known, a clutch release bearing of this type substantially comprises an operating element, which is adapted to be acted on by a control member, such as a clutch fork, and a drive element, which, under the action of the operating element, is adapted to act on the disengaging mechanism of a clutch, axially acting elastic means being supported by the operating element and bearing on the drive element in order to act on the latter in the direction of stop means which are axially fast with the operating element.

In practice, the drive element is capable of bearing on the disengaging mechanism of the clutch, approximately along a circumference, and the axially acting elastic means also bear on the drive element approximately along a circumference.

SUMMARY OF THE INVENTION

The present invention relates in general terms to an arrangement which is intended to improve the relative working conditions of the drive element and of the axially acting elastic means.

More precisely, it relates to a clutch release bearing of the type mentioned above, the improvement in this clutch release bearing resides in that the diameter of the bearing circumference of the axially acting elastic means on the drive element is approximately equal to the diameter of the circumference along which the drive element is capable of bearing on the disengaging mechanism of the clutch.

By virtue of this arrangement, the axially acting elastic means are not capable of causing any rocking torque on the drive element; furthermore, this arrangement favours compact construction of the whole assembly.

BRIEF DESCRIPTION OF THE DRAWINGS

FIG. 1 is a view in axial section of half a clutch release bearing according to the invention;

FIG. 2 is a partial view in elevation, in the direction of the arrow II in FIG. 1, of the axially acting elastic means of the clutch release bearing of FIG. 1;

FIG. 3 is a view showing part of a view analagous to that of FIG. 1, for a modified embodiment of the clutch release bearing according to the invention;

FIG. 4 shows, on an enlarged scale, a detail of FIG. 3, which is marked by an inset IV on the latter;

FIG. 5 is a view showing part of a view analagous to that of FIG. 1, for another modified embodiment of the clutch release bearing according to the invention;

FIG. 6 is a partial view in elevation of the axially acting elastic means in this modified embodiment shown in FIG. 5;

FIGS. 7 and 8 are respectively views similar to those of FIGS. 5 and 6, for another modified embodiment of the clutch release bearing according to the invention;

FIG. 9 is a view similar to that of FIG. 1, for another modified embodiment of the clutch release bearing according to the invention; and FIG. 10 is a view showing part of a view analagous to that of FIG. 1, for another modified embodiment of the clutch release bearing according to the invention.

DESCRIPTION OF THE PREFERRED EMBODIMENTS

With reference to the drawings there is shown a clutch release bearing comprising generally an operating element 10, which is adapted to be acted on by a control member, which in practice is a clutch fork not shown in the drawings, and a drive element 11, which, under the action of the operating element 10, is intended to act on the disengaging mechanism of the clutch, which is also not shown.

In the embodiment shown in FIGS. 1 and 2, the operating element 10 comprises a member made of a synthetic material, the said member being appropriately moulded and comprising a sleeve 12 and, at one of the ends of the sleeve, stop means in the form of an annular transversely extending collar 13 integrally formed with the sleeve 12 so as to be fast therewith both axially and in rotation.

For strengthening purposes, that surface of the annular collar 13, on the side where the drive element 11 is located, is covered by an annular bearing plate 14 which extends radially of, and around, the sleeve 12 of the operating element 10. The bearing plate 14 is provided, in the region covering the surface of the collar 13, with an aperture 15 by means of which the said plate can be rotationally locked with the collar 13 by engaging on a projection 16 formed integrally with the collar 13 of the operating element 10.

In diametrically opposite positions, the bearing plate 14 possesses two radially extending arms 18, suitable for the clutch fork to act on.

Corresponding to these radial arms 18 of the bearing plate 14, the collar 13 of the operating element 10 comprises, on its side opposite the bearing plate 14, two axially extending lugs 19 suitable for guiding the clutch fork and for making the operating element 10 rotationally fast therewith.

Thus, the bearing plate 14 of the operating element 10 is capable of withstanding the forces generated by the clutch fork, the sleeve 12 of the operating element 10 only having to withstand the frictional forces on a guide which is not shown.

In a manner which is in itself known, the drive element 11 comprises a ball-bearing. In the embodiments shown, the outer race 20 of the ball-bearing comprises, at one of its ends, a radially inwardly extending flange 21 by means of which the said outer race bears against the bearing plate 14, whilst the inner race 22 of the ball-bearing comprises an end portion 23 which projects axially in the direction opposite said one end of the outer race 20, for acting on the disengaging mechanism of the clutch.

In practice, as shown, the end portion 23 of the inner race 22 has a rounded profile in cross-section, so that it is capable of bearing on such a disengaging mechanism approximately along a circumference of diameter D1.

To keep the drive element 11 axially aligned, axially acting elastic means are provided and these means are supported by the operating element 10 and bear on the drive element 11 in order to act on the latter in the direction of the collar 13 forming part of the operating element 10.

In practice, in the embodiment shown in FIGS. 1 and 2, these axially acting elastic means comprise an annular member 25 which comprises a peripheral part 26, forming a cup spring, or Belleville washer, and a central part, which is divided into radial fingers 27 by means of slots 28, as in FIG. 2.

The radial fingers 27 of the annular member 25 engage in a groove 29 which is provided for this purpose in the periphery of the sleeve 12 of the operating element 10, the annular member 25 being thus supported by the latter. The peripheral part 26 of the said annular member 25 bears on the radial flange 21 of the outer race 20 of the drive element 11 and thus presses the flange 21 elastically against the bearing plate 14.

In practice, and as shown, a rim 30 of the peripheral part 26 of the annular member 25 bears on the radial flange 21 of the drive element 11, the rim 30 being of rounded axial cross-section and being formed on the extreme periphery peripheral part 26.

In all cases, the diameter D2 of the circumference along which the annular member 25 forming the axially acting elastic means bears on the drive element 11, and more precisely, bears on the radial flange 21 of the outer race 20 of the latter, is approximately equal to the diameter D1 of the circumference along which, as specified above, the drive element 11 is capable of bearing on the disengaging mechanism of the clutch.

The clutch release bearing is assembled in the following manner: the annular member 25 is positioned between the outer race 20 and the inner race 22 of the ball-bearing forming the drive element 11, during the actual construction of this ball-bearing, and, after the bearing plate 14 has been positioned, the said ball-bearing, equipped in this way with the annular member 25, is engaged on the sleeve 12 of the operating element 10 until the radial flange 21 of its outer race 20 comes into contact with the bearing plate 14.

Using a sheath engaged on the sleeve 12 and between the sleeve and the inner race 22 of the drive element 11, the radial fingers 27 of the annular member 25 are then forced into engagement with the groove 29 in the sleeve 12.

The annular member 25 then elastically presses the radial flange 21 of the drive element 11 in the direction of the collar 13 of the operating element 10.

Since the clutch release bearing is in practice of the self-centering type, as shown, an annular clearance J is allowed between the sleeve 12 of the operating element 10 and the internal periphery of the radial flange 21 of the drive element 11. Thus, the radial flange 21, which is in constant contact with the bearing plate 14, is free to move in all radial directions with respect to the axis of the whole assembly, and is thus free to move in all radial directions with respect to the operating element 10 and the bearing plate 14.

In all cases, the axially acting elastic means, which act on the drive element 11 in order to keep the latter axial, advantageously act on this drive element along a circumference, the diameter of which is approximately equal to the diameter of the circumference along which this drive element is itself intended to act on the disengaging mechanism of a clutch.

As will be noted, the drive element 11 is kept axial, that is to say this drive element 11 is axially fixed relative to the operating element 10, by means of a member, namely the annular member 25, which is located inside this drive element 11 itself.

As a result of these fixing means, there is no need for a cap on the outside of the whole assembly, and both the diametral bulk and axial bulk of the clutch release bearing according to the invention are advantageously reduced accordingly.

For the same purpose, the outer race of the drive element 11 comprises, between its cylindrical standard part 32 and its radially extending end flange 21, a connecting part 33 which is substantially oblique relative to the axis of the whole assembly. As a result of the outer race being provided with the oblique connecting part 32, each of the radial arms 18 of the bearing plate 14 is able to comprise a cylindrical portion 35 extending axially in a direction aligned with the oblique connection part 33, and the portion mean diameter D3, which is less than the mean diameter D4 of the circumference along which the cylindrical standard part 32 of the said outer race 20 extends. It is thus possible to bring the radial arms 18 of the bearing plate 14 on which the clutch fork will act closer to the drive element 11, and hence to reduce the axial bulk of the whole assembly without thereby substantially increasing the diametral bulk thereof.

It will be appreciated that, in the case of this type of clutch bearing with sustained self-centering, the peripheral part 26 of the annular member 25 is in permanent contact with the radial flange 21 of the drive element, along the diameter D2 which is approximately equal to the diameter D1. This results in an excellent compromise between the desirability of a reduced radial bulk which permits a small diameter D3, and effective elastic clamping of the drive element by means of the annular member 25.

According to a modified embodiment, illustrated by FIGS. 3 and 4, no specific groove is provided in the periphery of the sleeve 12 of the operating element 10, for supporting the annular member 25. On the contrary, an internal peripheral portion of the annular member is directly anchored by a force-fit on the sleeve 12, whereby it is prevented from moving forward, i.e. leftwardly as viewed in FIGS. 3 and 4, during operation of the clutch release bearing and its position is determined, either by means of a transverse shoulder 39 which projects radially from the sleeve 12, as shown, or, according to a modified embodiment which is not shown, by the assembly means employed for this positioning.

Moreover, the annular member 25 is integral in this case with an annular seal 37 which bears against the inner race 22 of the drive element in order to seal the internal volume of the latter. A seal 37 of this type can, for example, be moulded on the annular member 25; it can also be attached to the latter by glueing.

In a further embodiment, illustrated by FIGS. 5 and 6, the annular member 25 comprises, in its entirety, a cup spring with a rounded rim 30 along its external periphery, and it is broken at its circumference by means of a radial slot 36.

In the embodiment shown, the annular member 25 is engaged in a groove 29 which is specifically provided for this porpose at the external periphery of the sleeve 12, and as described with reference to FIGS. 1 and 2.

According to a yet further modified embodiment, illustrated by FIGS. 7 and 8, the axially acting elastic means comprise an initially plane washer 40, of the type commonly referred to as a cirlip. This is an elastic washer which is broken at its circumference by means of a slot 41, and the two ends of which are each provided with a hole 42 to enable it to be handled and opened out with the aid of a suitable tool.

As in the modified embodiment of the type described previously with reference to FIGS. 3 and 4, the internal peripheral portion of this washer 40 bears on the sleeve 12, thus gripping the said sleeve, and bears on the radial flange 21 of the outer race 20 of the drive element 11.

In the embodiment shown, for supporting the washer 40, the flange 21 is provided with at least one projecting boss which, in this case, is an annular boss 43 which, extends axially, in the direction of the washer 40, beyond that zone of the sleeve 12 of the operating element 10 which is gripped by the said washer. In practice, with the internal periphery of the washer 40 anchored by a force-fit on the sleeve 12, the abovementioned zone of the latter is determined, as previously, by means of a transverse shoulder 39 on the sleeve. The boss 43 on the radial flange 21 extends axially beyond the transverse shoulder 39 on the sleeve 12, in the direction of the washer 40.

The washer 40 can be positioned either by opening it out and pushing it onto the sleeve 12, or by screwing it onto the latter. In both cases, after it has been positioned, and because of the axial off-centering between its two supports, the washer 40 has a substantially frustoconical configuration which gives it the desired elasticity.

In a yet further still modified embodiment, illustrated by FIG. 9, the stop means, instead of comprising the annular collar 13 of the operating element 10, is reduced to comprising a simple flange. Each of the radial arms 18 of the bearing plate 14 is provided, at its end, with a right-angled bend forming a lug 44 for guiding the clutch fork and for rotationally locking it with the operating element 10.

In the foregoing text, the axially acting elastic means which hold the relevant part of the drive element 11 against the bearing plate 14, the said part in this case being the radial flange 21 of the outer race 20 of the said driving element, are arranged on the same side of the bearing plate 14 as the drive element 11, that is to say on the front side of the clutch release bearing.

In a modified embodiment, shown in FIG. 10, the said axially acting elastic means can be arranged on the rear end of the clutch release bearing, that is to say on that side of the bearing plate 14 which is opposite the side on which the drive element 11 is located. In other words, in this case, these axially acting elastic means are arranged on the other side of the bearing plate 14, relative to the drive element 11.

In the embodiment shown in FIG. 10, the said axially acting elastic means consist of an annular member 25 of the type described with reference to FIGS. 1 and 2. However, it is self-evident that they can consist of any one of the other means described with reference to FIGS. 3 to 8.

Whichever form of axially acting elastic means is used in the embodiment shown in FIG. 10, the function of the stop means, previously performed by the collar or flange 13, is performed by means of a washer 46 bearing against a shoulder 47 on the sleeve 12 of the operating element 10.

Moreover, the present invention is clearly not limited to the embodiments which have been described and shown, but encompasses any modified procedure and/or any modified combinations of the various elements.

In particular, although in the foregoing text it is always the outer race of the ball-bearing constituting the drive element 11 which is in contact with the bearing plate 14, this need not necessarily be the case. On the contrary, as a variant, the inner race of the ball-bearing may be in contact with the bearing plate, in particular for the embodiment shown in FIG. 10.

Moreover, the end portion 23 of the inner race 22 of the drive element 11 can have a plane profile, it being possible in this case for the disengaging mechanism on which this end portion is intended to bear to have a rounded profile, so that the contact between these elements is still made along a circumference of diameter $D_1$.

In any case, the diameter $D_1$ is taken to be the mean diameter of the inner and outer diameters of the end portion 23, the difference between the inner and outer diameters being twice the wall thickness of the end portion 23.

I claim:

1. A clutch release bearing comprising an operating element having a transverse abutment member fixed axially thereto, said operating element having means cooperable with a clutch control member, a drive element comprising an anti-friction bearing including an inner race and an outer race, said inner race having a portion cooperable with clutch release means along a first circumference of said drive element, said outer race having a radially inwardly extending flange, axially acting resilient means bearing against said radially inwardly extending flange along a general line of contact forming a second circumference of said drive element and urging said drive element toward said transverse abutment member, said first and second circumferences being substantially in axial alignment with said second circumference lying within an extension of the thickness of said inner race.

2. The clutch release bearing according to claim 1, wherein said axially acting resilient means comprises an annular member and said operating element comprises an axially extending sleeve, said annular member bearing along its inner periphery against said sleeve.

3. The clutch release bearing according to claim 2, wherein said annular member is in force-fitted relation on said sleeve.

4. The clutch release bearing according to claim 2, wherein a transverse shoulder is provided on said sleeve, said annular member inner periphery bearing against said transverse shoulder.

5. The clutch release bearing according to claim 1, wherein said axially acting resilient means comprises an annular member having spring washer radially outer portion, a radially inner portion divided into radial fingers, and a rim of rounded axial section at the outer periphery of said radially outer part, said rim bearing against said outer race flange.

6. The clutch release bearing according to claim 2, wherein there is an axial gap between the end of said inner race adjacent said outer race flange and said outer race flange, said annular member angles radially outwardly into contact with said outer race flange.

7. The clutch release bearing according to claim 2 or 6, wherein an annular seal is secured to said annular member and bears against said inner race.

8. The clutch release bearing according to claim 1, wherein said axially acting resilient means comprises a split spring washer having a radial slot.

9. The clutch release bearing according to claim 1, wherein said operating member comprises an axially extending sleeve, boss means being provided on said outer race flange, said second circumference being formed on said boss means, said axially acting resilient means comprising a normally flat split spring washer member gripped around said sleeve, said spring washer being loaded against said boss member into frustoconical configuration.

10. The clutch release bearing according to claim 1, wherein said outer race further comprises a cylindrical portion, a connecting zone between said cylindrical portion and said radially extending flange extending obliquely relative to the axis of said release bearing, a bearing plate fixed to said operating element and overlying said transverse abutment means, said outer race flange bearing against said bearing plate, said bearing plate comprising two radially extending arms cooperable with the control member, each of said bearing arms having an axially extending portion in alignment with said connecting portion of said outer race, said axial portion lying along another circumference having a diameter less than that of said cylindrical portion of said outer race.

11. The clutch release bearing according to claim 10, wherein said radially extending flange of said outer race bears along an annular zone the circular center line of which is in substantially alignment with said first and second circumferences.

12. The clutch release bearing according to claim 1, the operating element having an axially extending sleeve, the radially inner end of the outer race flange being spaced from the said sleeve of the operating element to permit self-centering of said drive element relative to said sleeve.

13. The clutch release bearing according to claim 12, wherein said space between said outer race flange and said sleeve is entirely empty to enable said outer race flange to be as close as possible to said sleeve.

* * * * *